(12) United States Patent
Haag et al.

(10) Patent No.: US 9,610,739 B2
(45) Date of Patent: Apr. 4, 2017

(54) WIND TURBINE BLADE REPAIR METHOD

(71) Applicant: LM WP PATENT HOLDING A/S, Kolding (DK)

(72) Inventors: Michael Drachmann Haag, Esbjerg (DK); Martin Dahl, Flensburg (DE)

(73) Assignee: LM WP PATENT HOLDING A/S, Kolding (DK)

( * ) Notice: Subject to any disclaimer, the term of this patent is extended or adjusted under 35 U.S.C. 154(b) by 0 days.

(21) Appl. No.: 14/783,872

(22) PCT Filed: Apr. 11, 2014

(86) PCT No.: PCT/EP2014/057401
§ 371 (c)(1),
(2) Date: Oct. 12, 2015

(87) PCT Pub. No.: WO2014/170232
PCT Pub. Date: Oct. 23, 2014

(65) Prior Publication Data
US 2016/0046088 A1    Feb. 18, 2016

(30) Foreign Application Priority Data

Apr. 17, 2013  (EP) .................... 13164141

(51) Int. Cl.
*B29C 73/02*    (2006.01)
*B29C 73/34*    (2006.01)
*B29C 37/00*    (2006.01)
*F03D 1/00*    (2006.01)
*B29C 73/30*    (2006.01)
*B29C 73/00*    (2006.01)
(Continued)

(52) U.S. Cl.
CPC .............. *B29C 73/02* (2013.01); *B05D 3/002* (2013.01); *B05D 3/0254* (2013.01); *B05D 3/0413* (2013.01); *B05D 3/12* (2013.01); *B05D 5/005* (2013.01); *B05D 7/50* (2013.01); *B05D 7/52* (2013.01); *B05D 7/54* (2013.01); *B29C 37/0075* (2013.01); *B29C 73/00* (2013.01); *B29C 73/26* (2013.01); *B29C 73/30* (2013.01); *B29C 73/34* (2013.01); *C08L 27/18* (2013.01); *F03D 1/003* (2013.01); *F03D 1/0633* (2013.01); *F03D 1/0641* (2013.01); *F03D 3/06* (2013.01); *F03D 3/061* (2013.01); *F03D 3/062* (2013.01); *F03D 80/50* (2016.05); *F03D 80/55* (2016.05); *B05D 2350/30* (2013.01); *B05D 2350/33* (2013.01); *B05D 2350/35* (2013.01); *B05D 2350/38* (2013.01); *B05D 2506/15* (2013.01); *B05D 2507/00* (2013.01); *B05D 2507/01* (2013.01); *B29C 2073/262* (2013.01); *B29K 2023/0633* (2013.01); *B29K 2027/18* (2013.01); *B29K 2075/00* (2013.01); *B29K 2223/0633* (2013.01); *B29K 2227/18* (2013.01); *B29K 2423/0633* (2013.01); *B29K 2427/18* (2013.01); *B29K 2623/0633* (2013.01); *B29K 2627/18* (2013.01); *B29L 2031/085* (2013.01); *Y02E 10/72* (2013.01); *Y02E 10/721* (2013.01)

(58) Field of Classification Search
CPC ......... B29C 73/00; B29C 73/02; B29C 73/30; B29C 73/34; B29K 2023/0633; B29K 2027/18; B29K 2223/0633; B29K 2227/18; B29K 2423/0633; B29K 2427/18; B29K 2623/0633; B29K 2627/18; C08L 27/18; F03D 1/003; F03D 1/0633; F03D 1/0641; F03D 3/06; F03D 3/061; F03D 3/062; F03D 80/50; F03D 80/55; B29L 2031/085; Y02E 10/721; B05D 3/002; B05D 3/0254; B05D 3/0413; B05D 3/12; B05D 5/005; B05D 7/50; B05D 7/52; B05D 7/54; B05D 2350/30; B05D 2350/33; B05D 2350/35; B05D 2350/38; B05D 2506/15; B05D 2507/00; B05D 2507/01
USPC ......................................................... 427/140
See application file for complete search history.

(56) References Cited

U.S. PATENT DOCUMENTS 4,293,862 A * 10/1981 Beavers .................. B29C 73/10
156/94
4,652,319 A    3/1987 Hammond
(Continued)

FOREIGN PATENT DOCUMENTS

DE    102008022699 A1    11/2009
DE    202009007118 U1    10/2010
(Continued)

OTHER PUBLICATIONS

ISR issued in International application No. PCT/EP2014/057401 mailed Jul. 7, 2014.

*Primary Examiner* — William Phillip Fletcher, III
(74) *Attorney, Agent, or Firm* — Nath, Goldberg & Meyer; Jerald L. Meyer; Tanya E. Harkins (57) ABSTRACT

A repair solution for a wind turbine blade is described. The repair solution includes the application of a layer of viscous coating material to the section of the blade to be repaired, which is cured to form a repaired surface. The layer of viscous coating material may be temporarily covered during the curing process using a film of Low Surface Energy material, to prevent defects in the repaired surface from dust, insects, etc. Additionally or alternatively, a temporary shield may be erected adjacent the curing layer of coating material, to allow for the control of the temperature and/or humidity levels of the region adjacent the curing material, to provide for more effective control of the curing process and to allow for repairs to be carried out for a wider process window.

20 Claims, 6 Drawing Sheets

(51) Int. Cl.
| | |
|---|---|
| *F03D 3/06* | (2006.01) |
| *F03D 1/06* | (2006.01) |
| *C08L 27/18* | (2006.01) |
| *F03D 80/55* | (2016.01) |
| *F03D 80/50* | (2016.01) |
| *B05D 7/00* | (2006.01) |
| *B05D 3/12* | (2006.01) |
| *B05D 3/04* | (2006.01) |
| *B05D 5/00* | (2006.01) |
| *B05D 3/00* | (2006.01) |
| *B05D 3/02* | (2006.01) |
| *B29C 73/26* | (2006.01) |
| *B29K 427/18* | (2006.01) |
| *B29K 227/18* | (2006.01) |
| *B29K 627/18* | (2006.01) |
| *B29K 27/18* | (2006.01) |
| *B29K 23/00* | (2006.01) |
| *B29K 75/00* | (2006.01) |
| *B29L 31/08* | (2006.01) |

(56) References Cited

U.S. PATENT DOCUMENTS

| | | | |
|---|---|---|---|
| 2005/0042102 A1* | 2/2005 | Teichert | B08B 1/04 416/146 R |
| 2006/0118230 A1* | 6/2006 | Eisenhut | B29C 73/02 156/94 |
| 2007/0036659 A1* | 2/2007 | Hibbard | B29C 63/22 416/233 |
| 2009/0246033 A1* | 10/2009 | Rudling | B32B 27/30 416/241 A |
| 2010/0047070 A1* | 2/2010 | Slot | F03D 1/065 416/146 R |
| 2010/0129229 A1 | 5/2010 | Grabau | |
| 2010/0135820 A1* | 6/2010 | Olson | B29C 73/10 416/241 R |
| 2011/0167633 A1* | 7/2011 | Anasis | F03D 1/003 29/889.1 |
| 2012/0138223 A1* | 6/2012 | Fang | B29C 35/0805 156/275.5 |
| 2012/0163981 A1* | 6/2012 | Hong | F01D 5/288 416/224 |
| 2014/0290832 A1* | 10/2014 | Arikawa | B29C 73/10 156/94 |
| 2014/0290851 A1* | 10/2014 | Takagi | B29C 73/12 156/306.6 |

FOREIGN PATENT DOCUMENTS

| | | |
|---|---|---|
| EP | 1 683 627 A1 * | 7/2006 |
| EP | 1683627 A1 | 7/2006 |
| EP | 2 371 523 A1 * | 10/2011 |
| EP | 2371523 A1 | 10/2011 |
| EP | 2594391 A1 | 5/2013 |
| GB | 2 483 469 A * | 3/2012 |
| GB | 2483469 A | 3/2012 |
| JP | 2009-208301 A * | 9/2009 |

* cited by examiner

WIND TURBINE BLADE REPAIR METHOD

This is a National Phase Application filed under 35 U.S.C. 371 as a national stage of PCT/EP2014/057401, filed Apr. 11, 2014, an application claiming the benefit to European Application No. 13164141.7, filed Apr. 17, 2013, the content of each of which is hereby incorporated by reference in its entirety.

FIELD OF THE INVENTION

The present invention relates to a method of repairing a portion of a wind turbine blade, and associated repair apparatus.

BACKGROUND OF THE INVENTION

Due to their location in relatively unprotected sites, wind turbines often experience considerable exposure to environmental conditions during the turbine lifetime. Such exposure can often result in localised wearing or erosion of sections of the surfaces of the wind turbine blades, in particular along the blade leading edge. These eroded sections can result in fractures or cavities forming on the blade surface, which can impact upon the blade aerodynamic and noise performance, as well as upon the appearance of the blade. Accordingly, regular service inspection of blades in use can often reveal the need for localised blade surface repair operations.

Due to the considerable expense and difficulty involved in the demounting and subsequent transportation of blades installed on a wind turbine tower, such localised repair operations are often performed in the field, and in particular when the blade to be repaired is still mounted to the greater wind turbine structure. Such in-field repairs place substantial demands on the efficiency and ease-of-implementation of the repair procedure, to reduce the time and cost involved in carrying out the blade repair. Furthermore, as such repairs are carried out in the field, the difficulty in providing effective control of process variables such as air temperature, humidity levels, etc., can impact on the effectiveness of the repair performed. As a result, current blade repair solutions possess considerable limitations.

An example of a blade repair solution is the Alexit® BladeRep™ coating system, provided by Mankiewicz Gebr. & Co., which provides for two-component polyurethane-based repair coating which can be applied to a section of a blade to be repaired. Another example of a blade repair solution is the Wind Blade Protection Coating W4600 from 3M™. However, such systems have the limitation of a very narrow process window, reducing effectiveness in relatively difficult repair conditions, e.g. in relatively hot or cold climates, or environments with a relatively high humidity level.

Alternatives include UV-light-based curing systems, such as the RENUVO™ system provided by Gurit Holding AG., where a resin is applied which can be cured using a UV-light source. While such systems are generally not as sensitive to environmental conditions, such UV-based systems require the deployment of dedicated UV lamps for the curing process to work. In addition, UV-cured coatings often present reduced long-term performance as a cured coating, often requiring increased levels of maintenance and future repair operations when compared to polyurethane-based systems. Additionally, this type of material requires complicated and expensive packaging in order to protect it against UV light, which could thereby initiate the cure process prior to application.

It is an object of the invention to provide a wind turbine blade repair method and apparatus which provides improved performance over existing repair solutions.

SUMMARY OF THE INVENTION

Accordingly, there is provided a method of repairing a section of the surface of a wind turbine blade, the method comprising the steps of:
identifying a section of the surface of a wind turbine blade to be repaired;
applying a layer of viscous coating material to said section such that said layer of viscous coating material is substantially flush with the surface of the wind turbine blade adjacent said section; and
curing said layer of viscous coating material to repair said section.

The use of a viscous coating material as a repair solution allows for a flexible and adaptive repair solution, and which does not require a large deal of surface preparation and treatment for use, nor does the repair solution have to be specifically constructed for the repair in question. It will be understood that the step of curing is intended to cover a hardening of the viscous coating material into a relatively solid coating layer on the wind turbine blade. Preferably, the section of the surface of a wind turbine blade comprises a section of a blade leading edge.

It will be understood that the wind turbine blade preferably comprises a structure formed from fibre-composite material, e.g. glass fibres and/or carbon fibres suspended in a cured resin. It will be further understood that the wind turbine blade is an essentially massive structure, preferably of at least 30 meters in length.

Preferably, said viscous coating material comprises a polyurethane based material, preferably a polyurethane elastomer coating, preferably an aliphatic polyurethane. The polyurethane-based material may comprise an aliphatic or aromatic isocyanate, preferably an aliphatic isocyanate.

The use of such materials provides a subsequently-repaired surface which presents good durability and erosion-resistance.

Preferably, the method comprises the step of:
preparing said section to be repaired to form a recess to receive a coating solution, and
wherein said layer of viscous coating material is applied to said recess such that said coating material substantially fills said recess and is substantially flush with the surface of the wind turbine blade adjacent said recess.

Preferably, said step of preparing said section comprises at least one of the following: sanding, machining, grinding, polishing, cutting, abrading, scraping, melting, solvent wiping, and/or plasma-activated corona treatment.

Preferably, said step of preparing comprises applying a marking to define the edges of said section to be repaired.

The step of applying a marking helps to delimit the area to be treated by the repair operation.

Preferably, said step of applying a marking comprises applying an adhesive tape to the surface of the wind turbine blade around the perimeter of the section to be repaired.

The use of an adhesive tape can result in a clean transition between repaired and existing structures after the repair operation is completed, once the tape is removed.

Preferably, the method comprises the step of after said curing, smoothing the cured layer of viscous coating material.

Preferably, said step of smoothing comprises polishing the exterior of said cured layer of viscous coating material, and/or smoothing the edges of said cured layer of viscous coating material.

Preferably, the method further comprises the steps of:
  after said applying said coating material, applying a layer of covering material over the exterior of said layer of viscous coating material, wherein said layer of covering material comprises a film of low surface energy material applied to the exterior of said layer of viscous coating material, and
  subsequent to said step of curing, removing said layer of covering material from said layer of coating material.

The use of the covering layer seals the viscous coating material from the environmental conditions, e.g. varying humidity levels, and prevents debris such as dust particles, insects, etc. from disturbing or impacting on the uncured coating. Furthermore, the use of a low surface energy material results in a film which can be easily removed from the surface of the wind turbine blade without disturbing the blade surface, leaving a smooth surface and without impacting on the cured or partially cured coating material.

Preferably, said layer of covering material is provided as a low-surface energy plastic or polymer material.

Preferably, said layer of covering material is a thin foil.

The use of a thin foil allows for the covering layer to be flexible to adapt to the blade surface, in particular to the curvature of a blade leading edge.

Preferably, said layer of covering material comprises a film of low surface energy material, wherein said material comprises a critical surface tension lower than approximately 30 mN/m, as measured by the Zisman method. The low surface energy allows the film to not adhere to the coating when cured.

Said layer of covering material may comprise any suitable material, preferably polymer films such as Low Density Polyethylene (LDPE), Polytetrafluoroethylene (PTFE), Polydimethylsiloxane (PDMS).

Preferably, said layer of covering material is provided with heating elements, preferably resistive heating elements incorporated into said layer of covering material. Preferably, the method comprises the step of applying heat to said layer of viscous coating material from said heating elements during said curing step. Applying this heat can allow for the acceleration of the curing process, and/or the use of the repair solution within a wider process window.

Preferably, said layer of covering material comprises a transparent foil.

If the foil is transparent, this allows for the visual inspection of the covered layer of coating material. It will be understood that an opaque or coloured foil may also be used.

Preferably, said layer of covering material is provided as a patch of greater size than that of the section to be repaired, the patch having an adhesive applied about the perimeter of patch to secure said patch to the surface of the wind turbine blade adjacent said section to be repaired.

Alternatively, the patch may be provided with an adhesive applied on the entire surface of the patch facing the surface of the blade.

The use of an adhesive-backed patch, with adhesive provided on either the patch perimeter or the entire rear surface of the patch, results in a single-step system which is simple to apply to the surface of the blade, and which presents considerable advantages in restricted work conditions, e.g. during field repairs of a blade mounted to a wind turbine.

Additionally or alternatively, the patch may be adhered to the blade by the adhesive properties of the layer of viscous coating material.

The patch may be provided without any adhesive on the entire surface facing the surface of the blade, thereby using the liquid coating as a way of fixating the patch to the blade. Alternatively, the adhesive properties of the liquid coating may improve the adhesive performance of any other adhesive provided to affix the patch to the blade.

In one aspect, the method comprises providing said marking tape as a double-sided adhesive tape, wherein a first adhesive surface of said adhesive tape is applied around the perimeter of the section to be repaired, and wherein a release liner is provided on an opposed second adhesive surface of said adhesive tape, and wherein the method comprises the step of removing said release liner to provide a bonding surface around the perimeter of the said section to be repaired, said bonding surface arranged to receive said foil.

In this case, the marking tape can fulfill a double purpose, being further used to secure the protective patch in place on the blade. Preferably, the adhesive used to bond to the foil is an adhesive suitable for bonding to an LSE material, e.g. 3M High-Strength Acrylic Adhesive 300LSE series.

In an additional or alternative aspect, the method comprises the step of securing said layer of covering material to said wind turbine blade by forming an adhesive bond between the layer of covering material and the surface of said wind turbine blade. Said adhesive bond may be in the form of an adhesive tape applied over the perimeter of said layer of covering material to bond said layer of covering material to the surface of the wind turbine blade adjacent the region to be repaired. Additionally or alternatively, said adhesive bond may be in the form of a separate adhesive material, e.g. a pressure-sensitive adhesive, provided between portions of said layer of covering material and the surfaces of the wind turbine blade to which it is desired to bond the said layer of covering material.

There is further provided a layer of covering material, as described, for use with the above-described method.

Preferably, the method comprises the steps of:
  after said step of applying said coating material, providing a temporary coating shield adjacent the surface of the wind turbine blade in the region of said section to be repaired, said temporary coating shield defining a curing region adjacent said section to be repaired, wherein said temporary coating shield is arranged to partially seal or cover said curing region; and
  after said step of curing, removing said temporary coating shield.

The use of a temporary coating shield next to the region to be repaired allows for further protection of the viscous material during curing. In addition, the definition of a partially sealed or covered curing region allows for the creation of an effective microclimate region adjacent the layer of viscous material during the curing step, allowing for the localized environment in the region of the layer of viscous material to be more effectively controlled, e.g. allowing for localized heating of the curing region and the contained viscous coating material to speed up the curing process. The temporary coating shield provides a buffer zone around the repair region.

The temporary coating shield is not completely sealed against the surface of the wind turbine blade, which distinguishes the invention from prior art repair systems utilising localised autoclaves. By contrast, the temporary coating shield can be relatively loosely held in place adjacent the repair region, allowing for ease of installation before, and removal after, a repair operation on a blade.

By allowing for such control of the environmental conditions adjacent the layer of curing viscous coating material, this allows the curing process of the coating material to be more effectively controlled, regardless of general environmental conditions, e.g. for a repair operation carried out in a relatively cold climate, where the relatively low temperature may impede the speed of the curing process, or in climates with relatively higher relative humidity, which could influence the end result of a polyurethane based coating system.

Preferably, the temporary coating shield defines an open-ended chamber or channel at said curing region.

Preferably, said temporary coating shield is arranged such that said open-ended chamber or channel extends along a portion of the leading edge of the wind turbine blade.

Preferably, the method comprises the step of providing an air cavity between the temporary coating shield and the curing region, preferably wherein said air cavity allows for the formation of a microclimate or microenvironment above or adjacent to said curing region.

Preferably, the method comprises the step of heating said defined curing region.

Said step of heating may be provided through the actuation of at least one heating element which may be provided on or supported by said temporary coating shield. Additionally or alternatively, said step of heating may be provided by passing hot air through said curing region, between said temporary coating shield and the adjacent surface of the wind turbine blade.

Preferably, the method comprises the step of providing a hot air source arranged to conduct hot air into said defined curing region.

The hot air source may comprise a heater provided with a fan arranged to blow hot air into said curing region defined between said temporary coating shield and the surface to be repaired. Preferably, the method comprises the step of blowing air through the defined curing region. Preferably, said fan is coupled to said curing region via a hose coupled to an inlet nozzle provided connected to said temporary coating shield. Preferably, said nozzle is below 20 cm in diameter, preferably between approximately 5-10 cm in diameter.

Additionally or alternatively, the method comprises the step of reducing the relative humidity of said defined curing region.

By reducing the humidity in the air adjacent the section to be repaired, this results in an accelerated cure process, and prevents the occurrence of defects caused by a side reaction between isocyanates which may be present in the coating material and any moisture in the air. Said step of reducing the relative humidity may comprise conducting or blowing dry air into said defined curing region.

Preferably, said step of providing a temporary coating shield comprises:
  attaching at least one supporting arm or bracket to a surface of the wind turbine blade; and
  carrying a shield member on said at least one supporting arm or bracket to form said temporary coating shield.

By providing a supporting arm to carry a separate shield member, the weight of the temporary coating shield can be reduced, as the separate shield member can be formed from a relatively lightweight material to be carried by the structural arm or bracket.

Preferably, said step of attaching comprises releasably securing said at least one supporting arm or bracket to a surface of the wind turbine blade.

Preferably, said releasably securing comprises providing at least one releasable securing means at one end of said at least one supporting arm or bracket, for example a vacuum cup, an adhesive tape, etc.

In a preferred embodiment, said at least one supporting arm or bracket is provided as an elongate member, preferably a relatively flexible member, which is releasably attachable at opposed ends of the elongate member to the surface of the wind turbine blade adjacent opposed sides of the region to be repaired.

It will be understood that the repair solution is preferably used to repair localised sections of a blade leading edge, preferably sections less than 10 meters in length along the longitudinal direction of the blade, preferably less than 5 meters, further preferably less than 2 meters.

In a preferred embodiment, said at least one a temporary coating shield comprises a lightweight cover, preferably formed from a plastics or polymer material.

Preferably, said shield is formed from a relatively flexible material, such that the shield may be shaped to conform to the profile of the at least one supporting arm or bracket when mounted on the wind turbine blade.

Preferably, said shield is releasably attached to said at least one supporting arm or bracket. The shield may be attached using any suitable attachment method, preferably a reusable attachment method, e.g. a magnet attachment, a button or snap-fit attachment, an adhesive bond, etc.

There is further provided a temporary coating shield as described, for use with the above-described method.

There is further provided a wind turbine blade having a section repaired according to the above-described method.

DESCRIPTION OF THE INVENTION

An embodiment of the invention will now be described, by way of example only, with reference to the accompanying drawings, in which.

It will be understood that elements common to the different embodiments of the invention have been provided with the same reference numerals in the drawings.

Figure 1:
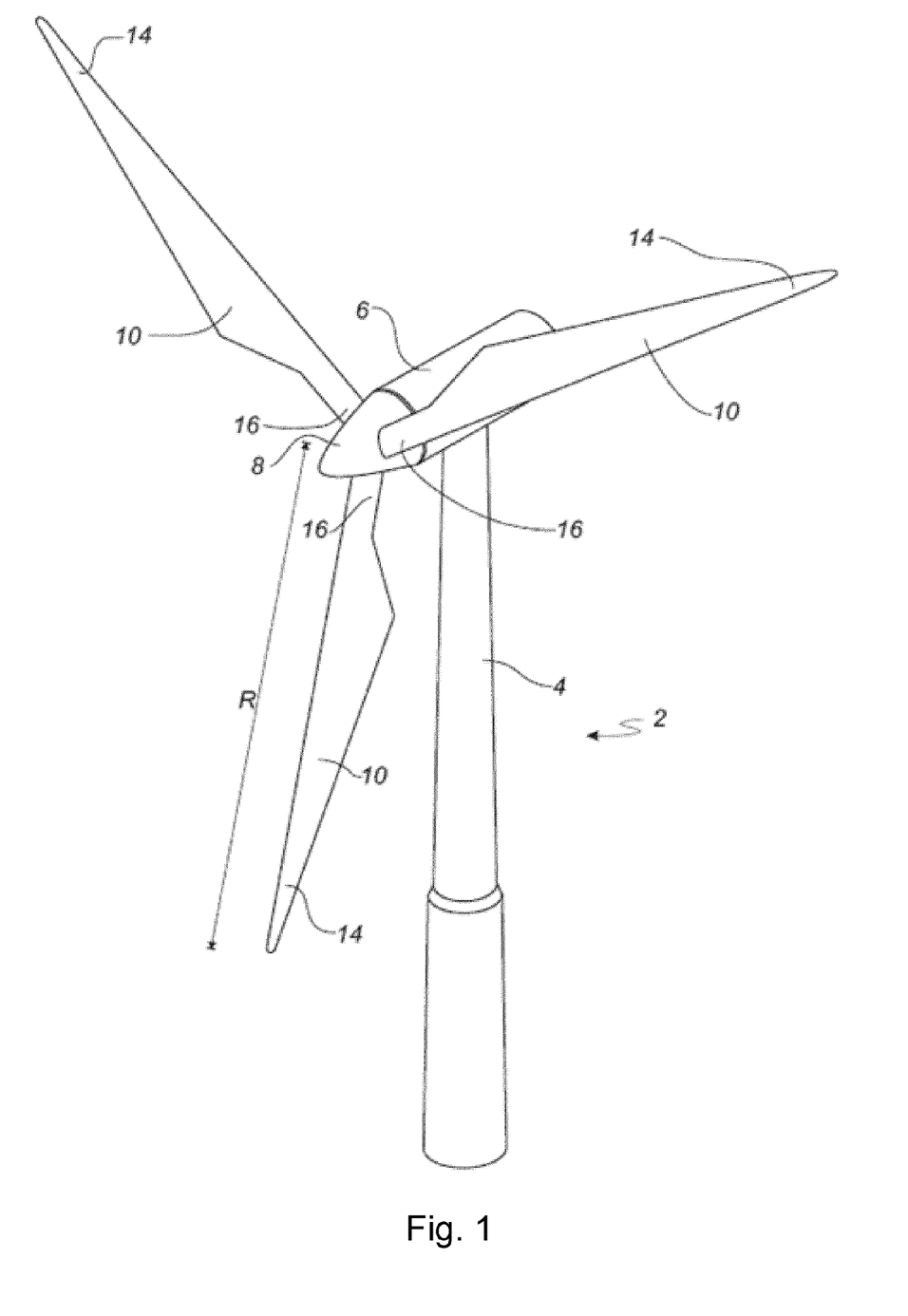
FIG. 1 shows a wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

Figure 2:
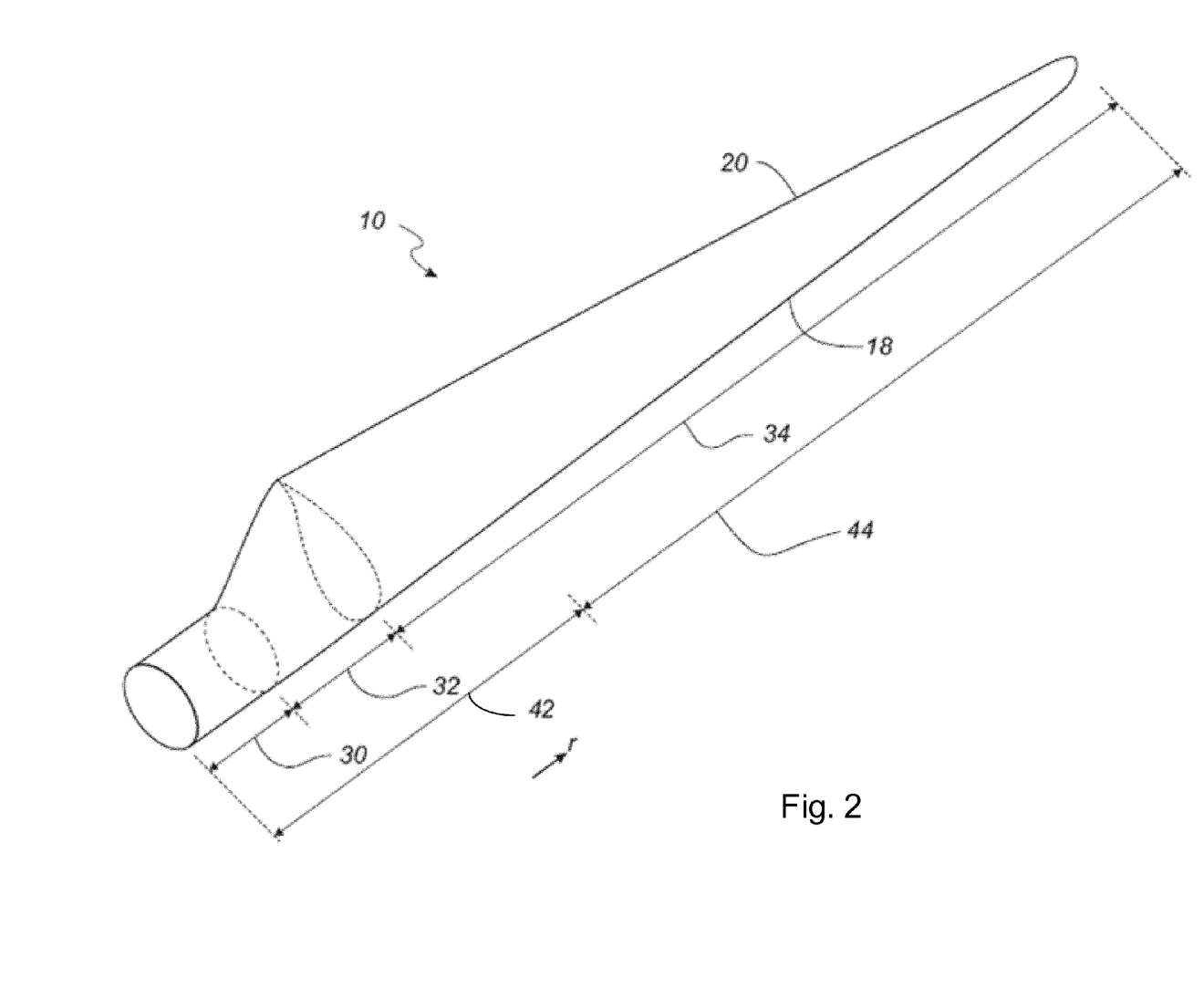
FIG. 2 shows a schematic view of a wind turbine blade according to the invention.

FIG. 2 shows a schematic view of a wind turbine blade 10. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile 42 gradually changing from the circular or elliptical shape 40 of the root region 30 to the airfoil profile 44 of the airfoil region 34. The chord length of the transition region 32 typically increases substantially linearly with increasing distance r from the hub.

The airfoil region 34 has an airfoil profile 44 with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

Figure 3:
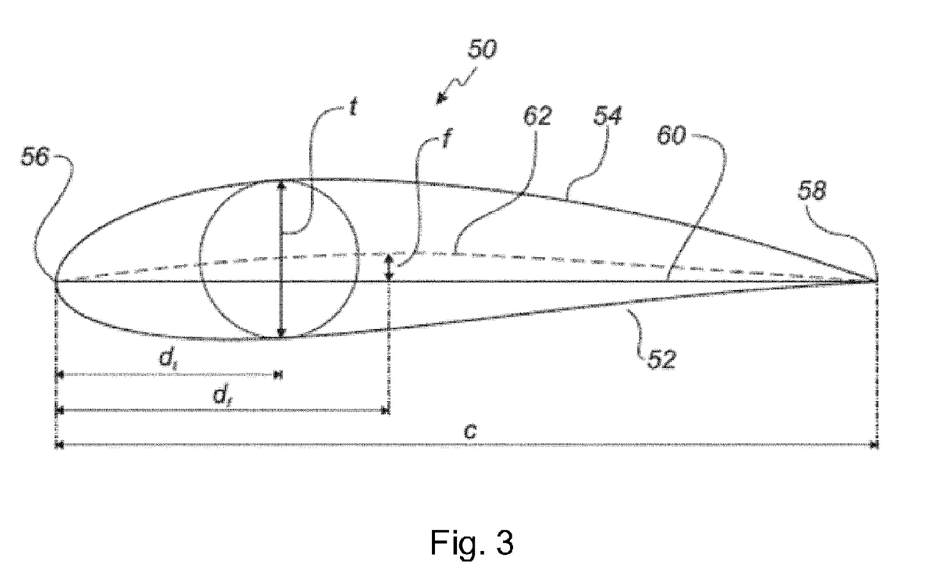
FIG. 3 shows a schematic view of an airfoil profile of the blade of FIG. 2.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber and lower camber, which are defined as the distances from the chord 60 and the suction side 54 and pressure side 52, respectively.

Airfoil profiles are often characterised by the following parameters: the chord length c, the maximum camber f, the position df of the maximum camber f, the maximum airfoil thickness t, which is the largest diameter of the inscribed circles along the median camber line 62, the position dt of the maximum thickness t, and a nose radius (not shown). These parameters are typically defined as ratios to the chord length c.

Wind turbine blades are generally formed from fibre-reinforced plastics material, e.g. glass fibres and/or carbon fibres which are arranged in a mould and cured with a resin to form a solid structure. Modern wind turbine blades can often be in excess of 30 or 40 meters in length, having blade root diameters of several meters. Wind turbine blades are generally designed for relatively long lifetimes and to withstand considerable structural and dynamic loading.

In the event of damage to a surface of the blade 10, e.g. erosion damage or other impact damage, such a damaged area is identified during a turbine inspection. Additionally or alternatively, the wind turbine 2 may be provided with a sensor system operable to detect the occurrence of damage to a blade surface, e.g. through monitoring of blade vibration levels. Once a section of a blade to be repaired is identified, the wind turbine rotor is locked into position with the blade in question preferably arranged in a vertical orientation to allow for ease of access.

With reference to FIGS. 4(a)-(e), a series of steps of a repair method according to an embodiment of the invention are illustrated.

Figure 4:
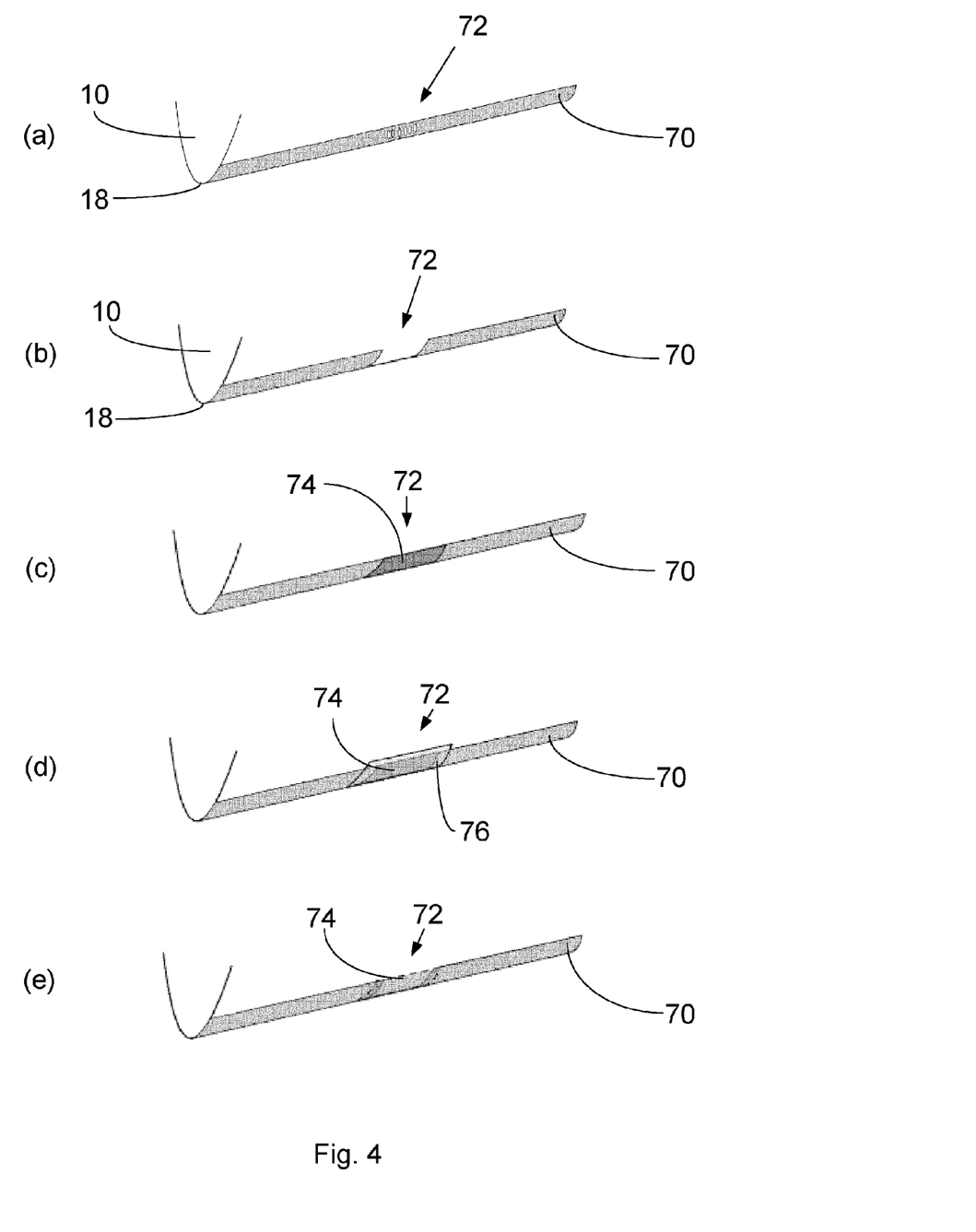
FIG. 4 illustrates a first series of steps of a repair method for a wind turbine blade according to an aspect of the invention.

In FIG. 4(a), a section of a leading edge 18 of a wind turbine blade 10 is illustrated. The leading edge of FIG. 4 comprises an erosion protection member indicated at 70. The erosion protection member 70 may comprise any suitable layer of erosion-resistant material arranged at the leading edge 18 of the blade 10 along a portion of the length of the blade 10, preferably as a coating applied to a surface of the blade structure. It will be understood however that the repair method of the invention may be performed on a wind turbine blade 10 without such a leading edge erosion protection member 70, wherein the following operations may be performed directly on the surface of the blade structure.

At a point along the length of the blade 10, a section of the blade 10 is identified which has experienced sufficient erosion or impact damage to merit a repair of the surface of the blade 10, such a section indicated at 72 in FIG. 4(a).

The section to be repaired 72 may be designated as a square or rectangular section centred on the damaged section of the blade 10, and may be delimited through the use of a suitable marker, e.g. adhesive tape (not shown), around the periphery of such a section. The section 72 is then treated to remove the erosion protection member 70 in the area of the damaged section, FIG. 4(b). Such treatment may include any suitable mechanical or thermal processing of the section of the erosion protection member 70, preferably a sanding operation or a heating of the erosion protection member 70 above the melting point of the material before the material is scraped away. Other possible treatments may include for example machining, grinding, polishing, cutting, abrading, scraping, solvent wiping, and/or plasma-activated corona treatment. The treatment may be a multi-stage process, wherein successive operations increasing in granularity are performed, which results in the creation of a smooth surface for the section to be repaired 72.

Once the section to be repaired 72 has been treated appropriately, a layer 74 of a coating material is applied to the section 72, FIG. 4(c). The layer is preferably applied as a viscous or liquid layer, which can be sprayed, rolled, brushed, or painted onto the surface of the blade 10 in the treated section 72.

Preferably, the layer of viscous coating material comprises a polyurethane-based material, preferably a polyurethane elastomer coating, and preferably an aliphatic polyurethane. The polyurethane-based material may comprise an aliphatic or aromatic isocyanate, preferably an aliphatic isocyanate. The use of such materials, such as the W4600 coating solution from 3M™, can provide a surface layer which presents good durability and erosion-resistance. In one aspect, the layer of coating material 74 may be formed of the same material as the leading edge erosion protection member 70. It will be understood that any suitable coating material may be used.

The layer 74 is applied to fill the section to be repaired 72, the thickness of the layer 74 approximately equal to the depth of the section 72, such that the outer surface of the layer 74 is substantially flush and in line with the surrounding exposed surface of the wind turbine blade 10, additionally in this case in line with the surface of the leading edge erosion protection member 70.

Once the layer of coating material 74 is applied to the section 72 of the blade 10, a layer of covering material 76 is applied over the viscous coating material layer 74, FIG. 4(d). The layer of covering material is preferably provided as a thin foil 76, which covers the external surface of the viscous material 74. The covering material 76 acts to seal the external surface of the coating material 74 during the curing or hardening of the coating material 74, preventing unwanted particles, e.g. dust, dirt, or insects from disturbing or impacting on the relatively viscous coating material 74, and affecting the smoothness or composition of the subsequent surface. The foil 76 can also act to seal the coating material 74 from the environmental conditions, e.g. varying atmospheric humidity conditions, etc., which may affect the curing process of the coating material 74.

The foil 76 is provided from a Low Surface Energy (LSE) material, preferably a low-surface energy plastic or polymer material. This results in a film which can be easily removed from the surface of the wind turbine blade without disturbing the blade surface, e.g. by peeling, leaving a smooth surface and without impacting on the cured or partially cured coating material. The foil 76 is preferably formed of material having a critical surface tension lower than 50 mN/m, preferably lower than approximately 30 mN/m, as measured by the Zisman method. The low surface energy allows the film to not adhere to the coating when cured.

The film 76 may be made from a transparent material, which allows the underlying layer 74 to be inspected through the film 76, or the film may be formed from a relatively opaque material. Said layer of covering material may comprise any suitable material, preferably polymer films such as Low Density Polyethylene (LDPE), Polytetrafluoroethylene (PTFE), Polydimethylsiloxane (PDMS).

The film 76 may be attached to the surface of the blade 10 using any suitable method, e.g. an adhesive such as a pressure-sensitive adhesive may be applied to the blade-facing surface of the film 76, preferably around the periphery of the film 76. The film 76 may then be adhered to the surface of the blade adjacent the edges of the section to be repaired 72. In an alternative aspect, an adhesive may be applied on the surface of the blade 10 adjacent the section to be repaired 72, the film 76 applied to said adhesive. In a further alternative aspect, the marker used to delimit the edges of the section to be repaired may be provided in the form of a double-sided adhesive tape, with a first adhesive side used to secure the tape to the blade 10, and a second adhesive side used to secure the film 76 to the tape. In an additional or alternative aspect, it will be understood that the layer of viscous coating material 74 may possess inherent adhesive properties to form a temporary bond with the film 76 on the blade 10.

The layer of coating material 74 is allowed to cure or harden, at which point the thin foil layer 76 can be removed from the surface of the wind turbine blade 10 to reveal the repaired surface beneath, FIG. 4(e). A further treatment may be performed on the cured layer of coating material 74 if required, e.g. a further mechanical polishing, in order to ensure an adequately smooth surface, and to provide a transition between the repaired section and the surrounding surface area, e.g. the pre-existing leading edge erosion protection member 70.

By covering the layer of coating material 74 during the curing process with a removable film 76, this results in an improved repair process, providing a repaired section 72 having a smooth and even surface, and which provides a faster and more controllable curing stage.

In a further embodiment of the invention, the removable film 76 may be provided with heating elements, preferably resistive heating elements incorporated into the film 76. The presence of such heating elements allows for heat to be applied to the layer of coating material 74 during the curing process, thereby accelerating the curing process, or at least allowing for the use of the repair method within a wider process window. Preferably, the heating elements are operable to generate a 20-30° C. temperature increase. Preferably, the heating elements are operable to heat the layer of coating material 74 above at least 15° C.

The heating elements may be provided as thin resistive wires embedded in the film 76, and/or as a resistive coating applied to a surface of the film 76. A current source or battery may be provided coupled to the heating elements, to provide a current to the heating elements during the curing process. Such a battery may be relatively small, due to the relatively minor heat change desired, and accordingly may be easily mounted to the surface of the blade 10 adjacent the film 76 during the curing process, e.g. by way of suitable adhesive bonding. Preferably, the removable film 76 is provided as a reusable component.

In an additional aspect, which may be used in combination with the removable film 76 or as a separate repair procedure, a temporary coating shield may be used adjacent the section to be repaired 72, and in particular extending over the layer of coating material 74. Such a shield can be used to create an effective microclimate region adjacent the curing material 74, allowing for greater control of the curing process and a much wider process window for performing repairs than is provided by the prior art.

Figure 5:
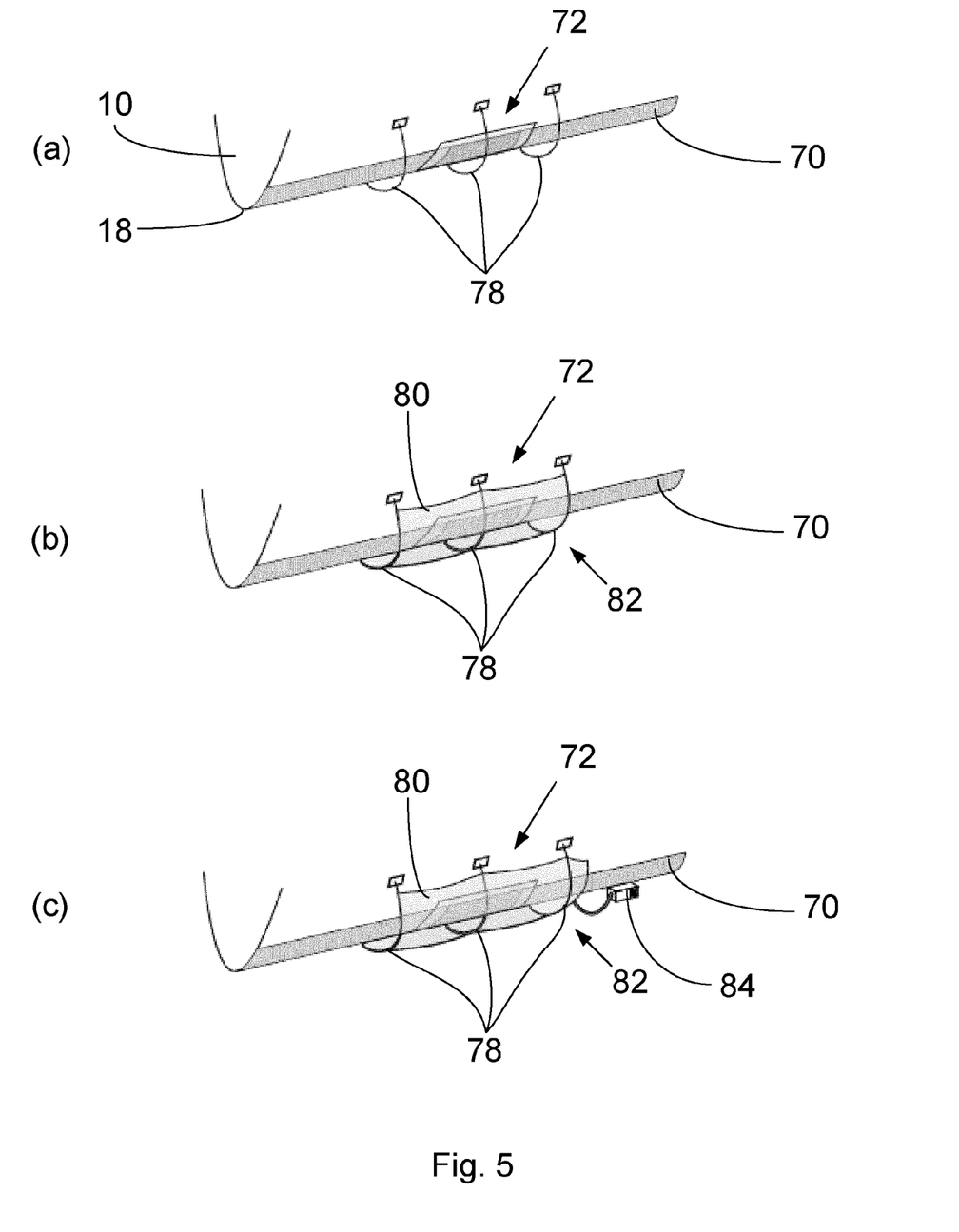
FIG. 5 illustrates a second series of steps of a repair method for a wind turbine blade according to an aspect of the invention.

FIG. 5 illustrates a series of steps of a repair method which may be combined with the method steps illustrated in FIG. 4, after the film 76 has been applied to the exterior of the layer of viscous coating material 74.

In FIG. 5(a), a series of supporting arms or brackets 78 are attached to the surface of the blade 10, adjacent the section to be repaired 72. Preferably, the brackets 78 are arranged to extend around the section to be repaired 72, presenting a basic cage-like structure adjacent the section 72.

With reference to FIG. 5(b), a shield member 80 is coupled to said brackets 78, the shield member 80 extending in an arcuate manner adjacent the section to be repaired 72. The shield member 80 substantially covers the section to be repaired 72, and partially seals or covers an area adjacent said section 72, effectively defining a curing region 82 which is at least partially protected from the ambient environmental conditions. The shield member 80 may be provided as a lightweight cover, preferably formed from a plastics or polymer material, and may be opaque or transparent.

Once the curing region 82 is defined adjacent the section to be repaired 72, a blower and/or heater device 84 may be coupled to the assembly, FIG. 5(c). This allows hot dry air to be passed into the curing region 82, and over the surface of the section to be repaired 72, aiding in the curing of the layer of coating material 74. By providing for effective control of the temperature and humidity levels adjacent the curing layer of coating material 74, the curing process can be accelerated rapidly, even at relatively low temperatures, such as below 15° C. This allows for the repair procedure to be effectively and quickly carried out for a wide range of temperatures and atmospheric conditions, widening the process window for the repair procedure.

The blower and/or heater device 84 may comprise a heater provided with a fan arranged to blow hot air into said curing region 82 defined between said temporary coating shield 80 and the surface to be repaired 72. The blower and/or heater device 84 may comprise a hose coupled to an inlet nozzle provided connected to said temporary coating shield 80, preferably below 20 cm in diameter, preferably between approximately 5-10 cm in diameter, such that the hot dry air can be conveyed directly to the curing region 82, with minimal heat losses or changes in humidity level between the blower and/or heater device 84 and the curing region 82.

After the curing process has effectively completed, the heater 82, shield 80, and brackets 78 can be removed from the blade 10, with the thin foil layer 76 removed from the surface of the wind turbine blade 10 to reveal the repaired surface, as in FIG. 4(*e*). Further surface treatment operations may be carried out at this point, as described above.

Figure 6:
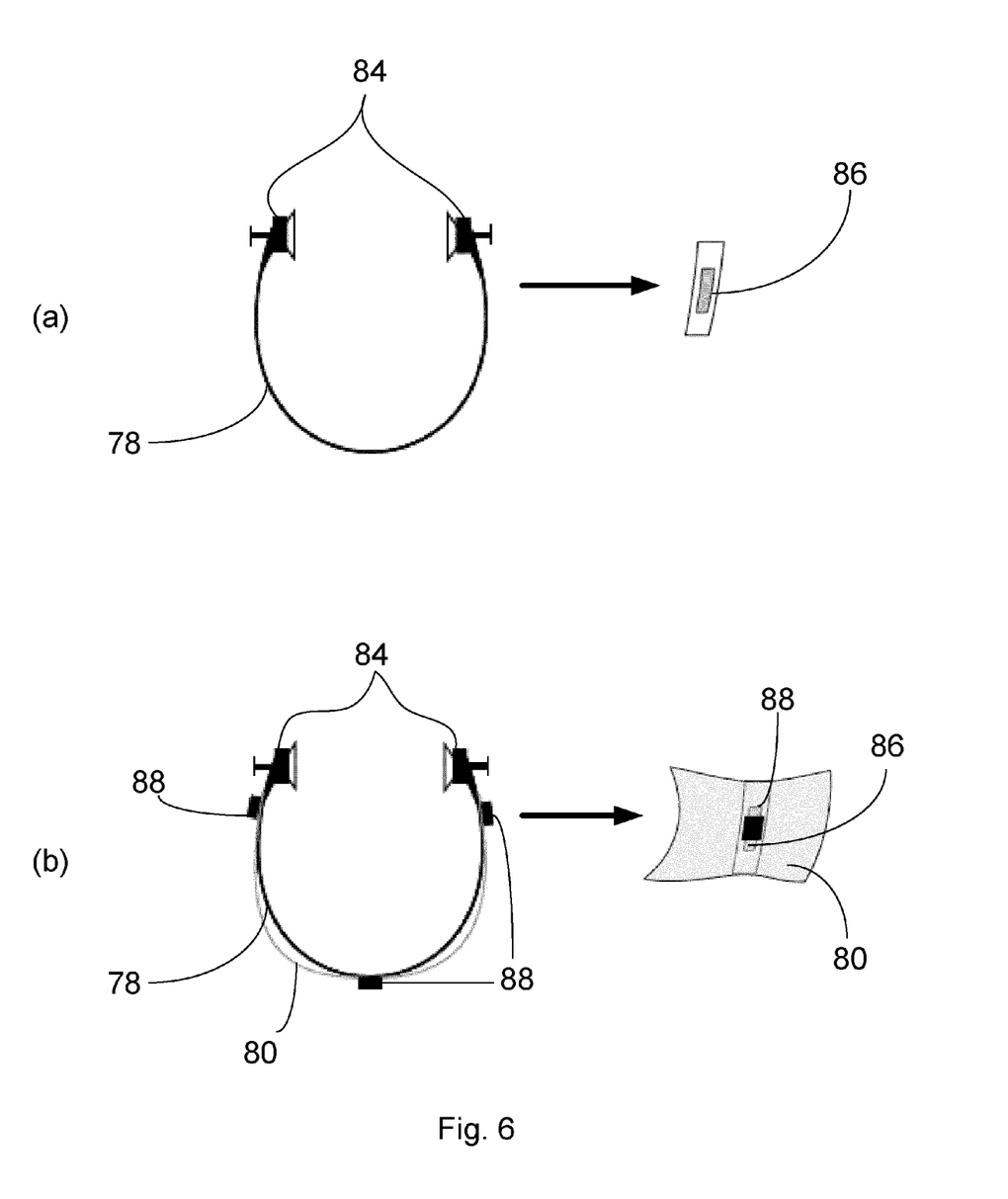
FIG. 6 shows plan views of a temporary coating shield for use with the repair method of FIG. 5.

FIG. 6 illustrates in more detail an example of a supporting bracket 78 as used in FIG. 5. FIG. 6(*a*) shows a plan view of a first bracket 78. The bracket 78 is provided as an elongate member, preferably formed from a relatively flexible material, having attachment means 84 provided at opposite ends of the elongate member. In FIG. 6, the attachment means 84 are provided as vacuum cups used to secure the ends of the bracket 78 to the surface of a wind turbine blade 10, but it will be understood that any suitable attachment means may be used, e.g. double sided adhesive tape. Preferably, the attachment means provide for a releasable connection between the bracket 78 and the blade surface.

In use, the bracket 78 is attached to the surface of the blade 10 such that the attachment means 84 are affixed to the blade surface at opposite sides of the section to be repaired 72, the bracket 78 forming a curved profile extending around the curvature of the leading edge 18 of the blade 10. It will be understood that the bracket and shield assembly may also be used for the repair of sections of the blade not provided at the blade leading edge 18. Furthermore, it will be understood that the blade may be positioned in any suitable orientation to facilitate repair, e.g. in a substantially horizontal or vertical alignment.

In one aspect, a plurality of further attachment elements 86 are provided along the length of the bracket 78, the further attachment elements 86 used to couple the bracket 78 to the shield member 80. In FIG. 6(*a*), the further attachment elements 86 are provided in the form of magnetic strips provided on the bracket 78, as shown in the side view illustrated in FIG. 6(*a*).

With reference to FIG. 6(*b*), the shield 80 is effectively wrapped around the exterior of the curved bracket 78, wherein magnets 88 are applied to the exterior of the shield 80, to hold the shield 80 in position between the magnets 88 and the magnetic strip or strips 86, as shown in the side view illustrated in FIG. 6(*b*).

The magnets 88 may be incorporated into the body of the shield 80, or may be applied as separate elements to the exterior surface of the shield 80. It will be understood that any suitable releasable attachment members may be used to couple the shield 80 to the brackets 78, e.g. a snap-fit coupling, adhesive bonding, etc. In an alternative embodiment, it will further be understood that the shield 80 and the brackets 78 may be provided as a single integrated structure which can be applied to the blade surface. In a further alternative embodiment, the shield 80 may be provided as a sliding or rolling door or curtain-type member, which can be moved between a retracted position and a deployed position, where the shield 80 is supported by at least one bracket 78.

In an additional or alternative embodiment, a flexible plastic sheet or panel may be relatively loosely wrapped around at least a portion of the periphery of a wind turbine blade in the region of a repair location, to provide a partial chamber above the repair region into which dry, heated air can be passed to improve the curing process of the repair. Such a flexible plastic sheet or panel may be attached to the blade using e.g. an adjustable strap or elasticated band which can be applied around the periphery of the blade.

The use of the repair method comprising the thin film 76 to protect the curing layer of coating material 74, and/or the use of the temporary shield member 80 to control the curing environment adjacent the section to be repaired 72, allows for a considerably improved repair solution, allowing for the undertaking of effective repair procedures with larger process windows compared to the prior art.

The invention is not limited to the embodiment described herein, and may be modified or adapted without departing from the scope of the present invention.

The invention claimed is:

1. A method of repairing a section of the surface of a wind turbine blade, the method comprising the steps of:
   identifying a section of the surface of a wind turbine blade to be repaired;
   applying a layer of viscous coating material to the section such that the layer of viscous coating material is substantially flush with the surface of the wind turbine blade adjacent the section;
   providing a temporary coating shield adjacent the surface of the wind turbine blade in the region of the section to be repaired, the temporary coating shield defining a curing region adjacent the section to be repaired, wherein the temporary coating shield is arranged to partially seal the curing region, wherein the step of providing a temporary coating shield comprises arranging the temporary coating shield to define an openended chamber or channel at the curing region, the openended chamber or channel arranged to extend along a portion of a leading edge of the wind turbine blade;
   heating the layer of viscous coating material to repair the section, thereby curing the viscous coating material; and
   removing the temporary coating shield after heating the curing region.

2. The method of claim 1, wherein the step of heating is provided through the actuation of at least one heating element provided on or supported by the temporary coating shield.

3. The method of claim 1, wherein the step of heating is provided by passing hot air through the curing region, between the temporary coating shield and the adjacent surface of the wind turbine blade.

4. The method of claim 1, wherein the method comprises the step of providing a hot air source arranged to conduct hot air into the defined curing region.

5. The method of claim 1, wherein the method comprises the step of reducing the relative humidity of the defined curing region.

6. The method of claim 1, wherein the step of providing a temporary coating shield comprises:

attaching at least one supporting arm or bracket to a surface of the wind turbine blade; and carrying a shield member on the at least one supporting arm or bracket to form the temporary coating shield.

7. The method of claim 6, wherein the step of attaching comprises releasably securing the at least one supporting arm or bracket to a surface of the wind turbine blade.

8. The method of claim 7, wherein the step of releasably securing comprises providing at least one releasable securing means at one end of the at least one supporting arm or bracket.

9. The method of claim 6, wherein the at least one supporting arm or bracket is provided as an elongate member, preferably a relatively flexible member, which is releasably attachable at opposed ends of the elongate member to the surface of the wind turbine blade adjacent opposed sides of the region to be repaired.

10. The method of claim 6, wherein the temporary coating shield is releasably attached to the at least one supporting arm or bracket.

11. The method of claim 6, wherein the temporary coating shield is formed from a relatively flexible material, such that the shield may be shaped to conform to the profile of the at least one supporting arm or bracket when mounted on the wind turbine blade.

12. The method of claim 1, wherein the method comprises the step of providing the temporary coating shield as a lightweight cover formed from a plastics or polymer material.

13. The method of claim 1, wherein the viscous coating material comprises a polyurethane based material, preferably a polyurethane elastomer coating, preferably an aliphatic polyurethane.

14. The method of claim 1, wherein the method comprises the step of:

preparing the section to be repaired to form a recess to receive a coating solution, and wherein the layer of viscous coating material is applied to the recess such that said coating material substantially fills the recess and is substantially flush with the surface of the wind turbine blade adjacent the recess.

15. The method of claim 14, wherein the step of preparing the section comprises at least one of the following:

sanding, machining, grinding, polishing, cutting, abrading, scraping, melting, solvent wiping, and/or plasma-activated corona treatment.

16. The method of claim 1, wherein the method comprises the step of after the curing, smoothing the cured layer of viscous coating material.

17. The method of claim 1, wherein the method further comprises the steps of:

after the applying the coating material, applying a layer of covering material over the exterior of the layer of viscous coating material, wherein the layer of covering material comprises a film of low surface energy material applied to the exterior of the layer of viscous coating material, and subsequent to the step of curing, removing the layer of covering material from the layer of coating material.

18. The method of claim 17, wherein the layer of covering material is provided as a low-surface energy plastic or polymer material.

19. The method of claim 17, wherein the layer of covering material comprises a film of low surface energy material, wherein the material comprises a critical surface tension lower than approximately 30 mN/m, as measured by the Zisman method.

20. The method of claim 17, wherein the layer of covering material comprises a polymer film formed by at least one of the following:

Low Density Polyethylene (LDPE), Polytetrafluoroethylene (PTFE), or Polydimethylsiloxane (PDMS).

* * * * *